Patented Oct. 2, 1945

2,385,776

UNITED STATES PATENT OFFICE 2,385,776

ABRASIVE COMPOSITIONS

Rupert S. Daniels, Union, and Anthony J. Mostello, Newark, N. J., assignors to Bakelite Corporation, a corporation of New Jersey No Drawing. Application February 21, 1942.
Serial No. 431,826

8 Claims. (Cl. 51—298)

This invention relates to the preparation of abrasive products and more particularly to a binder for abrasive grains in the preparation of grinding wheels and sandpaper.

In a previous Patent No. 2,125,893 of August 9, 1938, there is described and claimed the preparation of abrasive wheels by means of the alkyd resin as binders. As therein disclosed the alkyd resins have the property of losing their bonding strength under excessive heat generated in a grinding action and are for that reason useful in soft-bond wheels for polishing purposes.

While typical alkyd resins made from dicarboxylic acids, when used as binders in abrasive products, can be made to act as explained in the patent, it has now been found that fundamental changes in bonding properties occur when an unsaturated dibasic acid or anhydride, particularly maleic anhydride, is first reacted with a diolefine, such as cyclopentadiene, methyl cyclopentadiene, isoprene, piperylene, butadiene, or other low molecular weight diolefine. When such a reaction product or adduct, as of maleic anhydride, and with or without a fatty acid or oil, is esterified by means of a polyhydric alcohol—glycol, glycerol, pentaerythritol, dipentaerythritol, mannitol, polyalkylol amines, etc—a resin is obtained which is characteristically different from the known typical alkyd resins. As a bonding agent in a grinding wheel or abrasive paper, there is imparted a surprising resistance to lubricants and water commonly used in grinding operations, but more surprising is the retention and even a marked increase in strength at high temperatures (170° C.) as compared with normal room temperature strengths.

The heat-stability of the resin binders of this invention manifests itself both in the curing of an abrasive wheel and in a grinding operation. Typical alkyd resins as bonds in wheels require curing on a special temperature cycle which is much lower than that for phenol resin bonds, and the cure is at a much slower rate; resin-bonded wheels as herein disclosed can be cured on the regular phenol resin-bond cycle and at substantially the same relatively rapid rate of cure. This rapidity of cure is particularly advantageous in abrasive bonding as it minimizes any tendency for migration during the baking and thus promotes uniform well balanced structures. The usefulness of this property of heat-stability in a grinding operation is strikingly evident in thread grinding, where the contour of the wheel must be held to very close limits; the wheels as herein described retain their shape better than any other type of resin-bonded wheels.

The invention is illustrated by the following examples. In the preparation of the resins selected for illustration the following adducts were used for reaction with a polyhydric alcohol:

(a) Cyclopentadiene adduct of maleic anhydride (a solid);
(b) The liquid reaction product of maleic anhydride and a mixture of diolefines comprising principally isoprene, piperylene and some cyclopentadiene;
(c) Hydrogenated cyclopentadiene adduct of maleic anhydride.

Example 1

The adduct (a) was reacted with glycerol in the proportions of three parts by weight of the former to one part of the latter to form resin A; a second resin B was made from the same ingredients but in the proportion of four parts of the adduct to one part of glycerol; a third resin C was prepared from three parts of the liquid product (b) and one part of glycerol; and for comparison a typical alkyd resin D was made from two parts of phthalic anhydride and one part glycerol. In each case the procedure was the same; the reaction mass was boiled to eliminate the water of reaction and heating continued until a sample cooled to a brittle condition at room temperature. The resins were used in making cold-molded test bars by mixing one part of the resin with seven parts of abrasive grains; after molding the bars were baked in an oven under the following schedule:

| | Hours |
|---|---|
| Heating up to 185° F | 3 |
| Held at 185° F | 12 |
| Held at 185°–320° F | 14 |
| Held at 320° F | 60 | and cooled in the oven.

The bars were tested with the following results:

| | Flexural strength at 25° C. | Flexural strength at 170° C. | Percent retention of strength at 170° C. |
|---|---|---|---|
| A | 2,420 | 2,720 | 112.0 |
| B | 2,274 | 2,840 | 125.0 |
| C | 3,420 | 2,943 | 86.0 |
| D | 3,763 | 385 | 10.5 |

Example 2

Six hundred parts of the adduct (a) were melted and 200 parts of pentaerythritol were added; the mixture was brought to a temperature of about 200° C. and held for about 65 minutes or until a grindable, fusible heat-reactive resin was formed. A similarly reacted resin but carried only to a temperature of 200° C. was brought into solution by means of the monoethyl ether of ethylene glycol (this and the other resins described herein are soluble in the usual alkyd resin solvents); the solution contained about 65-70% solids. Test bars were made by wetting 70 parts by weight of No. 50 aluminous oxide grains with one part of the solution and adding to the wetted grains about 10 parts of the powdered solid resin. The bars were cold-molded and baked for a period of 47 hours at a temperature of 200° F. and raised to 360° F. during the cycle. The average flexural strength of the bars at room temperature was 2912 lbs. per sq. in. and at 170° C. increased to 4867 or an increase of 160%.

Example 3

An oil-modified resin was made by reacting three parts of the adduct (a) with one part of pentaerythritol and one part of tung oil; the reaction was carried to a temperature of 230° C. A brittle resin was obtained which was soluble in toluene. Abrasive paper was prepared by coating a paper base with the toluene solution, sprinkling abrasive grit on the coating, air-drying and then baking at 110° C. for 40 hours.

A similar resin was prepared but substituting mixed linoleic acids for the tung oil. This gave a satisfactory hard film or binder.

Example 4

A resin similar to the preceding example was made by heating to 210° C. 100 grams of tri-isopropanol amine with 130 grams of adduct (a) or cyclopentadiene-maleic anhydride. This was dissolved in blown soya bean oil, in proportions of 50 gallons of oil to 100 pounds of resin and make a satisfactory binder for abrasive grit.

Example 5

A light colored heat-reactive resin was made from 20 parts of the adduct (a) and 7.5 parts of mannitol; the latter was added to the former after heating to 180° C., and the heating of the mixture was continued for one hour at 200°–215° C. This gave a resin satisfactory for the bonding of abrasive grains.

Example 6

The hydrogenated form or adduct (c) was heated with triethanolamine in the proportion of five parts to three parts of the latter. After reacting for one hour, a fusible grindable heat-reactive resin was obtained. Abrasive bars made with this resin had very good strength and water resistance.

Example 7

A mixture of three parts of adduct (a) or cyclopentadiene-maleic anhydride and one part of glycerine was reacted at approximately 200° C. for one hour. To this was added 1.5 parts of a resinous product derived from the condensation of formaldehyde and p-hydroxy-benzoic acid and pentaerythritol. The reaction was continued to a stage of brittleness upon cooling to room temperature. The product was grindable and heat reactive. As a binder for abrasive grains it was found to have excellent strength and water and heat resistance.

Example 8

A satisfactory bonding resin was obtained by the reaction of 225 parts of the hydrogenated form or adduct (c) with 100 parts of glycerol by dehydrating and reacting to a brittle grindable condition when cold.

Example 9

The hydrogenated form or adduct (c) was reacted with pentaerythritol in the proportion of three parts of the former to one part of the latter to yield a useful bonding agent.

In Example 1 there is set out a comparison of a number of resins as herein disclosed with a typical alkyd resin. A further interesting comparison was made by preparing strips of resin and baking them for 48 hours at 400° F.; resins described herein lost in weight about 5% to 8%, but the alkyd resin lost approximately 50% in weight. This demonstrates the remarkable heat stability of the resins herein defined.

What is claimed is:

1. Abrasive article comprising abrasive grains and a bonding agent for the grains comprising essentially the reaction product of a diolefine adduct of a conjugated unsaturated dibasic acid and a member of the group consisting of polyhydric alcohols and polyalkylol amines.

2. Abrasive article comprising abrasive grains and a bonding agent for the grains comprising essentially the reaction product of cyclopentadiene maleic anhydride adduct and a member of the group consisting of polyhydric alcohols and polyalkylol amines.

3. Abrasive article comprising abrasive grains and a bonding agent for the grains comprising essentially the reaction product of cyclopentadiene maleic anhydride adduct and a polyhydric alcohol.

4. Abrasive article comprising abrasive grains and a bonding agent for the grains comprising essentially the reaction product of cyclopentadiene maleic anhydride adduct and glycerol.

5. Abrasive article comprising abrasive grains and a bonding agent for the grains comprising essentially an oil-modified reaction product of a diolefine adduct of a conjugated unsaturated dibasic acid and a member of the group consisting of polyhydric alcohols and polyalkylol amines.

6. Abrasive article comprising abrasive grains and a bonding agent incorporated with the grains in a powdered solid form, said agent comprising essentially a reaction product of a diolefine adduct of a conjugated unsaturated dibasic acid and a member of the group consisting of polyhydric alcohols and polyalkylol amines.

7. Abrasive article comprising abrasive grains and as a bonding agent for the grains essentially a reaction product of a diolefine adduct of a conjugated unsaturated dibasic acid and a member of the group consisting of polyhydric alcohols and polyalkylol amines, said reaction product having in admixture a reaction product of a phenol-carboxylic acid, formaldehyde and a polyhydric alcohol.

8. Abrasive article comprising abrasive grains and a bonding agent for the grains comprising essentially the reaction product of a diolefine adduct of maleic anhydride and a member of the group consisting of polyhydric alcohols and polyalkylol amines.

RUPERT S. DANIELS.
ANTHONY J. MOSTELLO.